United States Patent
Liu et al.

(10) Patent No.: US 9,553,793 B2
(45) Date of Patent: Jan. 24, 2017

(54) SINGLE SOURCE SHORTEST PATH RESOLUTION

(71) Applicants: TERADATA US, INC., Dayton, OH (US); Lijun Zhao, Haidian District, Beijing (CN)

(72) Inventors: Yuyang Liu, Chaoyang District (CN); Huijun Liu, Hengyang (CN); Yu Wang, Haidian District (CN); Lijun Zhao, Haidian District (CN)

(73) Assignee: Teradata US, Inc., Dayton, OH (US)

( * ) Notice: Subject to any disclaimer, the term of this patent is extended or adjusted under 35 U.S.C. 154(b) by 0 days.

(21) Appl. No.: 14/128,889

(22) PCT Filed: Dec. 31, 2012

(86) PCT No.: PCT/CN2012/088031
§ 371 (c)(1),
(2) Date: Dec. 23, 2013

(87) PCT Pub. No.: WO2014/101176
PCT Pub. Date: Jul. 3, 2014

(65) Prior Publication Data
US 2015/0295812 A1    Oct. 15, 2015

(51) Int. Cl.
*H04L 12/733*    (2013.01)
*G06F 17/30*    (2006.01)

(52) U.S. Cl.
CPC ....... *H04L 45/122* (2013.01); *G06F 17/30324* (2013.01); *G06F 17/30498* (2013.01); *G06F 17/30595* (2013.01)

(58) Field of Classification Search
None
See application file for complete search history.

(56) References Cited

U.S. PATENT DOCUMENTS

| 6,646,989 B1 * | 11/2003 | Khotimsky ............ H04L 45/12 370/238 |
| 6,704,320 B1 | 3/2004 | Narvaez et al. |

(Continued)

FOREIGN PATENT DOCUMENTS

| CN | 102360367 A | 2/2012 |
| WO | WO-2014101176 A1 | 7/2014 |

OTHER PUBLICATIONS

"International Application Serial No. PCT/CN2012/088031, International Search Report mailed Oct. 3, 2013", 3 pgs.

(Continued)

*Primary Examiner* — Wei Zhao
*Assistant Examiner* — Ronald H Davis
(74) *Attorney, Agent, or Firm* — Schwegman, Lundberg & Woessner, P.A.

(57) ABSTRACT

Techniques for resolving single source shortest path for database processing are provided. Graph data for nodes having weights for edges of a database network are iterated producing a new message table and results table in each iteration. The results table stores the minimum path weight. For each iteration the graph data and message table are joined to produce a state of a node and outgoing edge messages. The message table and results table are co-grouped to generate a new message for a next node to process. When done the single source shortest path for the network is produced.

4 Claims, 3 Drawing Sheets

(56) References Cited

U.S. PATENT DOCUMENTS

| | | | | |
|---|---|---|---|---|
| 6,757,258 | B1* | 6/2004 | Pillay-Esnault | H04L 45/02 370/254 |
| 7,457,286 | B2 | 11/2008 | Alexander, Jr. | |
| 7,593,341 | B1 | 9/2009 | Buriol et al. | |
| 7,664,040 | B2 | 2/2010 | Alexander, Jr. | |
| 7,903,563 | B2 | 3/2011 | Schollmeier et al. | |
| 8,005,610 | B2 | 8/2011 | Bast et al. | |
| 2003/0117966 | A1* | 6/2003 | Chen | H04L 45/02 370/255 |
| 2004/0151124 | A1* | 8/2004 | Hauser | H04L 41/0663 370/252 |
| 2004/0236762 | A1 | 11/2004 | Chaudhuri et al. | |
| 2005/0097108 | A1* | 5/2005 | Wang | G06F 17/30595 |
| 2006/0271564 | A1 | 11/2006 | Meng Muntz et al. | |
| 2007/0280174 | A1* | 12/2007 | Pun | H04L 45/36 370/338 |
| 2009/0129316 | A1* | 5/2009 | Ramanathan | H04L 45/123 370/328 |
| 2010/0290480 | A1* | 11/2010 | Westphal | H04L 45/02 370/408 |

OTHER PUBLICATIONS

"International Application Serial No. PCT/CN2012/088031, Written Opinion mailed Oct. 3, 2013", 3 pgs.
"Apache Hadoop", [online}. Wikipedia, the free encyclopedia. [archived Nov. 12, 2013]. Retrieved from the Internet: <URL: https://web.archive.org/web/20141112102748/http://en.wikipedia.org/wiki/Apache_Hadoop>, (Nov. 11, 2014), 13 pgs.
"Pig Latin Reference Manual 1", [online]. (c) 2007-2010 The Apache Software Foundation. [archived on Nov. 26, 2013]. Retrieved from the Internet: <URL: https://web.archive.org/web/20131126222152/http://pig.apache.org/docs/r0.7.0/piglatin_ref1.html>, (Dec. 17, 2014), 10 pgs.
"Shortest path problem", [online]. Wikipedia, the free encyclopedia, [archived on Aug. 17, 2013]. Retrieved from the Internet: <URL: https://web.archive.org/web/20130817072610/http://en.wikipedia.org/wiki/Shortest_path_problem>, (Jul. 20, 2013), 8 pgs.
Malewicz, Grzegorz, et al., "Pregel: a system for large-scale graph processing", Proceedings of the 2010 ACM SIGMOD International Conference on Management of Data (SIGMOD '10), (2010), 135-146.

* cited by examiner

SINGLE SOURCE SHORTEST PATH RESOLUTION

RELATED APPLICATIONS

This application is a U.S. National Stage Application under 35 U.S.C. §371 of International Application No. PCT/CN2012/088031, filed Dec. 31, 2012, which application is hereby incorporated by reference in its entirety.

BACKGROUND

After over two-decades of electronic data automation and the improved ability for capturing data from a variety of communication channels and media, even small enterprises find that the enterprise is processing terabytes of data with regularity. Moreover, mining, analysis, and processing of that data have become extremely complex. The average consumer expects electronic transactions to occur flawlessly and with near instant speed. The enterprise that cannot meet expectations of the consumer is quickly out of business in today's highly competitive environment.

Consumers have a plethora of choices for nearly every product and service, and enterprises can be created and up-and-running in the industry in mere days. The competition and the expectations are breathtaking from what existed just a few short years ago.

The industry infrastructure and applications have generally answered the call providing virtualized data centers that give an enterprise an ever-present data center to run and process the enterprise's data. Applications and hardware to support an enterprise can be outsourced and available to the enterprise twenty-four hours a day, seven days a week, and three hundred sixty-five days a year.

As a result, the most important asset of the enterprise has become its data. That is, information gathered about the enterprise's customers, competitors, products, services, financials, business processes, business assets, personnel, service providers, transactions, and the like.

Updating, mining, analyzing, reporting, and accessing the enterprise information can still become problematic because of the sheer volume of this information and because often the information is dispersed over a variety of different file systems, databases, and applications. In fact, the data and processing can be geographically dispersed over the entire globe. When processing against the data, communication may need to reach each node or communication may entail select nodes that are dispersed over the network.

Optimizing the shortest communication path between nodes is referred to as the shortest path problem, which is associated with graph analysis. The single source shortest path problem is the problem of finding a shortest path between a single vertex (node) and every other vertex (node) in the graph (network). Again, this problem is complex because with large scale processing, the data spans nodes across the globe, and processing of data cannot be handled on a single node. Moreover, to improve throughput multiple nodes often processing in parallel on different portions of the data.

In response, the industry has recently embraced a data platform referred to as Apache Hadoop™ (Hadoop™). Hadoop™ is an Open Source software architecture that supports data-intensive distributed applications. It enables applications to work with thousands of network nodes and petabytes (1000 terabytes) of data. Hadoop™ provides interoperability between disparate file systems, fault tolerance, and High Availability (HA) for data processing. The architecture is modular and expandable with the whole database development community supporting, enhancing, and dynamically growing the platform.

However, because of Hadoop's™ success in the industry, enterprises now have or depend on a large volume of their data, which is stored external to their core in-house database management system (DBMS). This data can be in a variety of formats and types, such as: web logs; call details with customers; sensor data, Radio Frequency Identification (RFID) data; historical data maintained for government or industry compliance reasons; and the like. Enterprises have embraced Hadoop™ for data types such as the above referenced because Hadoop™ is scalable, cost efficient, and reliable.

Enterprises want a cost-effective solution to access relational data from Hadoop™ using a MapReduce™ solution, which heretofore has been elusive and spotty at best in the industry. However, some companies have sought to develop their own map reduce features to improve on the Hadoop™ approach. One such advancement has occurred with Aster Data™ and its extension of Structured Query Language (SQL) with its Map Reduce (MR) processing embedded in standard SQL as enhancements and referred to as SQL/MR.

That is, enterprise's want the ability to access their internally-maintained DBMS's via Hadoop™ MapReduce™ implementations to improve information integration, scalability, maintenance, and support issues.

SUMMARY

In various embodiments, techniques for resolving single source shortest path for database processing are presented. According to an embodiment, a method for resolving single source shortest path is provided.

Specifically, a starting message table is acquired and graph data and the starting message table are joined to calculate a state of the node and outgoing edge messages for the graph data. Next, the messages are grouped and the starting message table and a result table are cogrouped to generate new messages in a new message table. Finally, the message table is replaced with the new message table.

DETAILED DESCRIPTION

Figure 1:
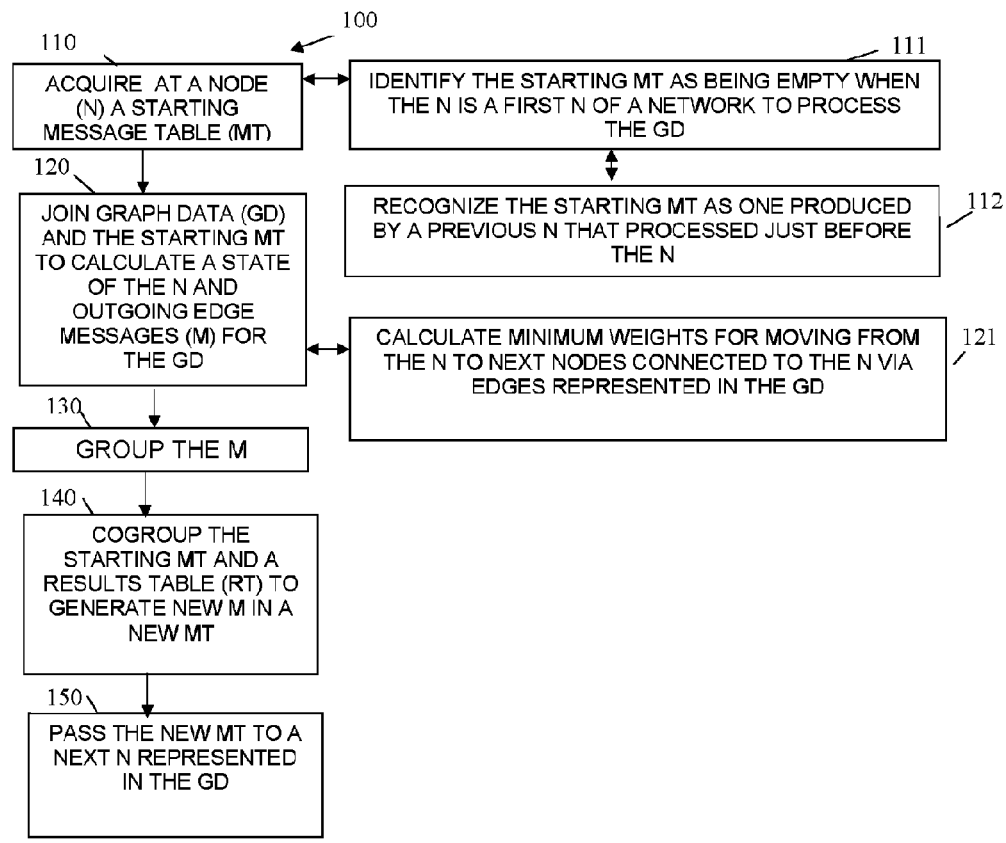
FIG. 1 is a diagram of a method for resolving single source shortest path, according to an example embodiment.

FIG. 1 is a diagram of a method 100 for resolving single source shortest path, according to an example embodiment. The method 100 (hereinafter "path resolver") is implemented as executable instructions that are programmed and reside within memory and/or non-transitory computer-readable storage media for execution on processing nodes (processors) of a network; the network wired, wireless, and/or a combination of wired and wireless.

Before discussing the processing identified for the path resolver presented in the FIG. 1, some embodiments and examples of the path resolver are presented for comprehension and illustration.

Cogroup is a feature, which is used to organizing relevant data together. One can co-group T1 (table A) and T2 (table B), which means that tuples from A and B are jointly grouped together based on attributes or partition indexing, using this command: COGROUP T1 BY c11, T2 BY c21; one can cogroup by multiple columns the same way as for a group.

A sample result of cogroup is, and is presented for discussion and illustration:

<1, {<1, 2, 3>}, {<1, 3>}>
<2, { }, {<2, 4>, <2, 7>, <2, 9>}>
<4, {<4, 2, 1>, <4, 3, 3>}, {<4, 6>, <4, 9>}>
<7, {<7, 2, 5>}, { }>
<8, {<8, 3, 4>, <8, 4, 3>}, {<8, 9>}>

Notice that all of the original tuples whose first field is 1 are grouped together; the original tuples whose first field value is 2 are together, and so on. Thus, similar to a group operation, the result of a cogroup has one tuple for each group. The first field is called group as before and contains the value on which grouping has been performed. Furthermore, every tuple has a bag for each relation being co-grouped (having the same name as the alias for that relation) that contains the tuples of that relation belonging to that group.

A sample Structured Query Language (SQL) Map Reduce (MR) Syntax for finding a Single Source Shortest Path (SSSP) is as follows (provided in Aster Data™ SQL/MR format (extension to SQL having map reduce processing features)):

```
SELECT * FROM findShortestPath(
  ON (SELECT 1) PARTITION BY 1
  GRAPH_TABLE ('<graph table name>')
    RESULT_TABLE('<result table name>')
  SOURCE('<source point id>')
);
```

The processing algorithm that uses the cogroup feature and the sample SQL is as follows. Assume initially that the graph (representation for the database network) is an undirected graph and all the weights on the edge are positive. Since the graph data is too huge to reside in memory, even to store it in a single machine, the large amount of graph data is reduced to the following and stored into a fact table as:

```
CREATE FACT TABLE graph_data_table(
  vertex_beg    BIGINT,  -- begin vertex of an edge
  vertex_end    BIGINT,  -- end vertex of an edge
  weight        FLOAT
) DISTRIBUTE BY HASH(vertex_beg);
```

The SSSP algorithm is implemented by iteratively graph traveling using map-reduce processing and is summarized as follows:

I. Each iteration is called a super step.
II. During a super step S, for each vertex V (node), the executor (node processing) consume the then current message table generated by previous super step S−1, and produces a new message table for next super step S+1 and a result table, which stores the minimal path weight.

The V's graph data table and message table are joined; the message table stores the messages generated by previous super step S−1, to calculate the state of V and outgoing edge messages.

Messages are grouped to reduce message redistribution.

Cogroup the message table and result table to generate the messages to other vertices (nodes) that will are received in the next superstep S+1 into a new message table.

The message table received in S is now replaced with new message table.

Pseudo code for achieving the SSSP is as follows (comments in the pseudo code describe the processing taking place).

```
/**
 * Compute the shortest path from source srcv to each vertex in graph g,
 * and store the result in table result_table.
 */
void computeSSSP(long srcv, string graph_data_table, string result_table)
{
    // Create a table to store the
    CREATE TABLE result_table(
  vertex      BIGINIT,  -- the destination vertex of a path
  mindistance FLOAT     -- the minimum distance from source to current vertex
    ) DISTRIBUTE BY HASH(vertex);
    // Initial message table from directed connected vertex from srcv.
    CREATE TEMP FACT TABLE message_table (
currentVertex BIGINT,
mindistance FLOAT)
        DISTRIBUTE BY HASH(currentVertex)
        AS
            SELECT vertex_end, weight
            FROM graph_data_table
            WHERE vertex_beg = srcv;
    // execute superstep iteratively until no more message exists.
    WHILE (true)
    {
        CALL ExecuteSuperStep( );
        IF (result table has no update) BREAK;
    }
}
// Walk through the graph by move one step forward, and generate a new
message table and result table.
void ExecuteSuperStep( )
{
    // Step 1: This view aims to minimize the new distance information by moving
    one step forward in graph.
```

```
    // Note: Considering only message which is minimal distance to the target
vertex is meaningful,
    //   we do a group by operation with min( ) function to reduce the redistributed
message number.
        //     It is similar to "combiner" in Hadoop.
        CREATE VIEW message_table_update (
currentVertex BIGINT,
mindistance FLOAT)
        AS
            SELECTgraph_data_table.vertex_end,
min(message_table.mindistance + graph_data_table.weight)
            FROM graph_data_table,
                JOIN message_table
                    ON graph_data_table.vertex_beg = message_table.currentVertex
                GROUP BY graph_data_table.vertex_end;
        // Step 2: update minimum distance for result_table, and store new
message into message_new_table
        CREATE TABLE message_table_new(
currentVertex      BIGINT,   -- the current vertex of a path
mindistance        FLOAT    -- the minimum distance from source to current vertex
        ) DISTRIBUTE BY HASH(currentVertex);
        SELECT *
        FROM generateNewMessage(
            ON message_table_update PARTITION BY currentVertex
            ON result_table PARTITION BY currentVertex
            NEW_MESSAGE_TABLE('message_table_new')
        );
        MERGE INTO result_table
        USING message_table_new
            ON result_table.currentVertex = message_table_new.currentVertex
        WHEN MATCHED THEN
            UPDATE SET result_table.mindistance = message_table_new.mindistance;
        WHEN NOT MATCHED THEN
            INSERT (currentVertex, mindistance)
VALUES(message_table_new.currentVertex, message_table_new.mindistance);
        // Step 3: replace message_table with message_table_new
        DROP TABLE IF EXIST message_table;
        RENAME TABLE message_table_new TO message_table;
}
The SQLMR function generateNewMessage( ) is implemented by cogroup.
/**
 * Figure out those rows in message table, which mindistance is less than
pairs in result_table or which
 * don't have pairs in result_table. And store those rows in table
message_table_new.
 */
class generateNewMessage
            : public MultipeInputFunction
{
void OperateOnMultipleInputs(RowIterationSet inputs, RowEmitter emit)
        {
            RowIterator msg_iter = inputs.get('message_table_update');
            RowIterator rlt_iter = inputs.get('result_table');
            IF (msg_iter.advancedToNextRow( )
            {
                IF (! rlt_iter.advancedToNextRow( ))
                {
                    // new added message
                    INSERT INTO message_table_new VALUES msg_iter.getTuple( );
                }
                ELSE IF (msg_iter.getTuple ( ).get('mindistance') <
rlt_iter.getTuple( ).get('mindistance')
                {
                    // new updated message
                    INSERT INTO message_table_new VALUES msg_iter.getTuple( )));
                }
            }
        }
    }
```

The above detail describes an implementation of the path manager, reference is now made to the FIG. 1 and processing embodiments of the path manager.

At 110, the path manager acquires a starting message table. The path manager processing on a node of the network. As used herein a "node" may be used synonymously and interchangeably with "vertex," as presented above.

According to an embodiment, at 111, the path manager identifies a starting message table as being empty when the node is a first node of a network to process the graph data. So, in this case the node having the path manager is the first to start processing the graph data.

Continuing with the embodiment of 111 and at 112, the path manager recognizes the starting message table as one produced by a previous node that processed the path manager just before the node.

It is noted that the path manager processes as multiple instances over a distributed network, each node having an instance of the path manager.

At 120, the path manager joins graph data and the starting message table to calculate a state of the node and outgoing edge messages for the graph data.

At 121, the path manager calculates minimum weights for moving from the node to next nodes connected to the node via edges and represented in the graph data.

At 130, path manager passes the new message table to a next node represented in the graph data.

According to an embodiment, at 140, the path manager co-groups the stating message table and the results table to generate new messages in a new message table. Continuing with 140 and at 150, the path manager pass the new message table to a next node represented in the graph data.

Figure 2:
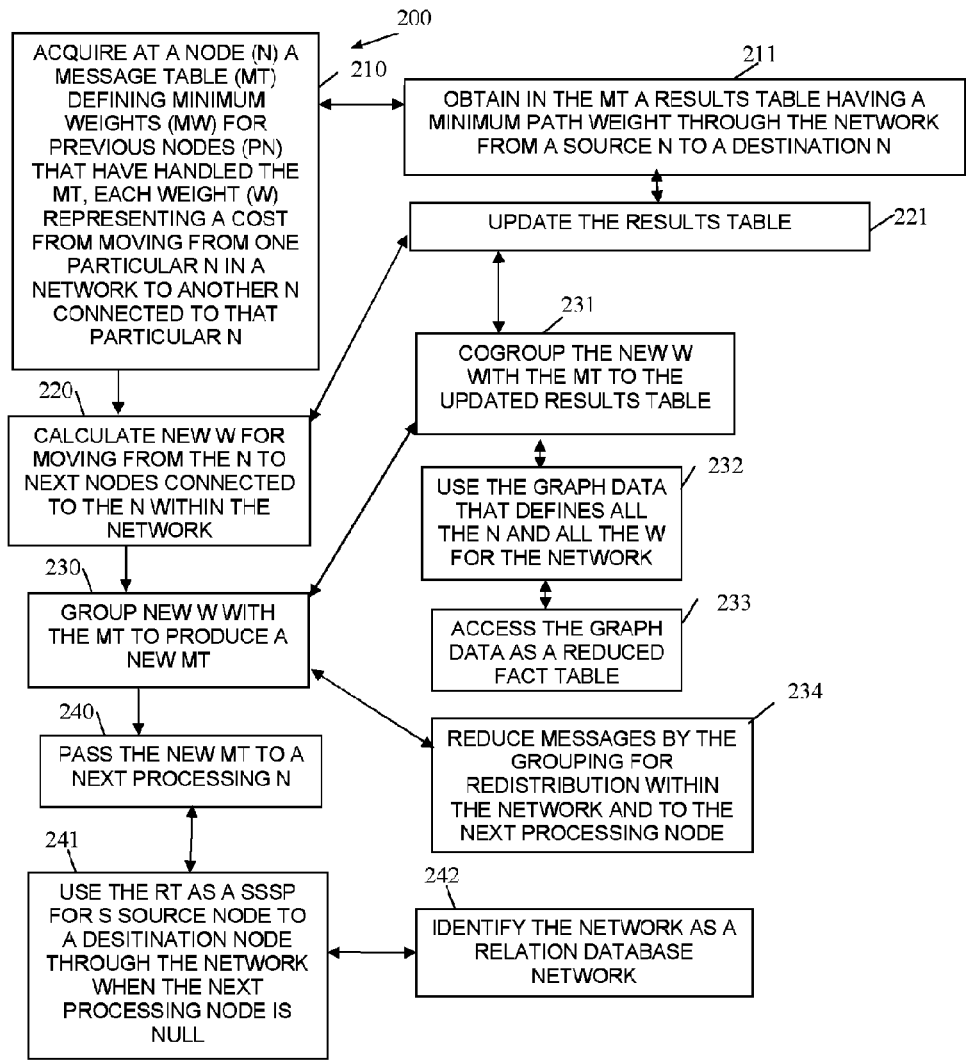
FIG. 2 is a diagram of another method for resolving single source shortest path, according to an example embodiment.

FIG. 2 is a diagram of another method 200 for resolving single source shortest path, according to an example embodiment. The method 200 (hereinafter "path controller") is implemented as executable instructions within memory and/or non-transitory computer-readable storage media that execute on one or more processors (nodes), the processors specifically configured to path controller. The path controller is also operational over a network; the network is wired, wireless, or a combination of wired and wireless.

The path controller presents another and in some ways an enhanced perspective of the path resolver presented above with respect to the FIG. 1.

At 210, the path controller acquires a message table that defines minimum weights for previous nodes that have handled the message table. Each weight representing a cost for moving from one particular node in a network to another node connected to that particular node.

According to an embodiment, at 211, the path controller obtains in the message table a results table having a minimum path weight through the network from a source node to a destination node.

At 220, the path controller calculates new weights for moving from the node to next nodes connected to that node within the network.

Continuing with the embodiment of 211 and at 221, the path controller updates the results table.

At 230, the path controller groups the new weights with the message table to produce a new message table.

Continuing with the embodiment of 221 and at 231, the path controller cogroups the new weights with the message table to the updated results table.

Still continuing with the embodiment at 231 and at 232, the path controller using the graph data that defines all the nodes and all the weights for the network.

Continuing with the embodiment of 232 and at 233, the path controller accesses the graph data as a reduced fact table.

In an embodiment, at 234, the path controller reducing messages by the grouping (at 230) for redistributing within the network and to the next processing node.

At 240, the path controller passes the new message table to a next processing node.

According to an embodiment, at 241, the path controller uses the results table as a SSSP for a source node to a destination node through the network when the next processing node is null. In other words, the node having the instance of the path controller is the last processing node in the network (graph data).

Continuing with the embodiment of 241 and at 242, the path controller identifies the network as a relational database network.

Figure 3:
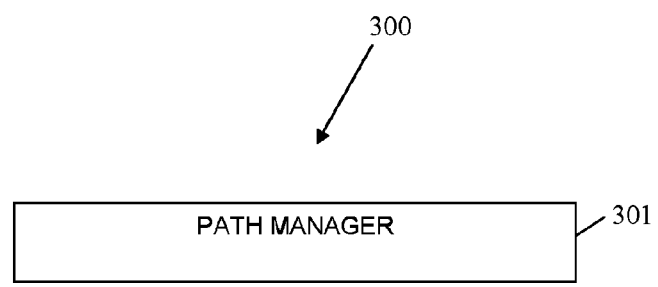
FIG. 3 is a diagram of a single source shortest path resolving system, according to an example embodiment.

FIG. 3 is a diagram of a single source shortest path resolving system 300, according to an example embodiment. The components of the single source shortest path resolving system 300 are implemented as executable instructions that are programmed and reside within memory and/or non-transitory computer-readable storage medium that execute on processing nodes of a network. The network is wired, wireless, or a combination of wired and wireless.

The single source shortest path resolving system 300 implements, inter alia, the methods 100 and 200 of the FIGS. 1 and 2.

The single source shortest path resolving system 300 includes a path resolver 301.

Each processing node includes memory configured with executable instructions for the path resolver 301. The path resolver 301 processes on the processing nodes. Example processing associated with the path resolver 301 was presented above in detail with reference to the FIGS. 1 and 2.

The path resolver 301 is configured to consume a message table and a results table from a prior node to iteratively build a single source shortest path for a source node to a destination node within the network. The message table and results table cogrouped together before being passed from the node to a next node within the network.

According to an embodiment, the path manager 301 is implemented in structured Query Language (SQL).

In another case, the path manager 301 is configured to process graph data representing at least adjacent nodes to the node and weights for moving from the node to the adjacent nodes.

In an embodiment, the network is a distributed relational database network.

In another situation, the results table is configured to house a running minimum path weight for the single source shortest path.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented and programmed within a non-transitory computer-readable storage medium and processed by a processing node (node), the node configured to execute the method, comprising:

acquiring, at the node, a starting message table that represents an identifier for a vertex processing node of a graph of a network of processing nodes and the starting message table representing a distance from a source node to that vertex within the network;

joining, at the node, graph data and the starting message table to calculate a state of the node and outgoing edge messages for the graph data, wherein the graph data includes a beginning vertex of an edge in the graph and an ending vertex of an edge in the graph;

grouping, at the node, the messages;

cogrouping, at the node, the starting message table and a result table to generate new messages in a new message table, and wherein the result table including a destination vertex from the graph and a minimum distance from the source node to a current vertex;

replacing, at the node, the message table with the new message table and producing a shortest path from the source node within the network to a destination node as the new message table for network path traversal of network communications; and passing, from the node, the new message table to a next node represented in the graph data.

2. The method of claim 1, wherein acquiring further includes identifying the starting message table as being empty when the node is a first node of a network to process the graph data.

3. The method of claim 2, wherein identifying further includes recognizing the starting message table as one produced by a previous node that processed the method just before the node.

4. The method of claim 1, wherein joining further includes calculating minimum weights for moving from the node to next nodes connected to the node via edges and represented in the graph data.

* * * * *